US010008008B2

United States Patent
Zebaze et al.

(10) Patent No.: US 10,008,008 B2
(45) Date of Patent: Jun. 26, 2018

(54) METHOD AND APPARATUS FOR ASSIGNING COLOURS TO AN IMAGE

(71) Applicant: Straxcorp Pty Ltd, Melbourne (AU)

(72) Inventors: Roger Zebaze, Coburg (AU); Yu Peng, Southbank (AU)

(73) Assignee: STRAXCORP PTY LTD, Melbourne (AU)

(*) Notice: Subject to any disclaimer, the term of this patent is extended or adjusted under 35 U.S.C. 154(b) by 59 days.

(21) Appl. No.: 15/021,752

(22) PCT Filed: Sep. 10, 2014

(86) PCT No.: PCT/AU2014/000886
§ 371 (c)(1),
(2) Date: Mar. 14, 2016

(87) PCT Pub. No.: WO2015/035443
PCT Pub. Date: Mar. 19, 2015

(65) Prior Publication Data
US 2016/0225166 A1    Aug. 4, 2016

(30) Foreign Application Priority Data

Sep. 13, 2013  (AU) ................. 2013903530

(51) Int. Cl.
*G06T 7/90* (2017.01)
*H04N 1/60* (2006.01)
(Continued)

(52) U.S. Cl.
CPC .............. *G06T 7/90* (2017.01); *G06K 9/4652* (2013.01); *G06K 9/52* (2013.01); *G06K 9/6215* (2013.01);
(Continued)

(58) Field of Classification Search
None
See application file for complete search history.

(56) References Cited

U.S. PATENT DOCUMENTS 6,584,216 B1 * 6/2003 Nyul ................. G06T 5/009
250/474.1
8,339,411 B2   12/2012 Wade et al.
(Continued)

FOREIGN PATENT DOCUMENTS

WO    2011141853    12/2011

OTHER PUBLICATIONS

Supplementary Partial European Search Report, EP Application No. 14844501.8, dated Sep. 2, 2016.
(Continued)

*Primary Examiner* — Kim Vu
*Assistant Examiner* — Nathan Bloom
(74) *Attorney, Agent, or Firm* — Greenberg Traurig, P.A.; Corinne M. LaGosh (57) ABSTRACT

A method and system for assigning colors to an image or part thereof, the method comprising: selecting a sequence of colors for assignment to the image or part thereof; determining a minimum intensity $I_{MIN}$ within the image or part thereof; determining a maximum intensity $I_{MAX}$ within the image or part thereof; and determining relative intensity values RIV(i) for each pixel or voxel i according to; (I) where I(i) is an intensity of pixel or voxel /, and ƒ is a preselected function (such as to re-arrange the normalized values); and assigning colors to at least some pixels in the image or part thereof based on the relative intensity values and an order of each of the colors in the sequence.

25 Claims, 7 Drawing Sheets (51) Int. Cl.
  H04N 1/62    (2006.01)
  G06T 7/11    (2017.01)
  G06T 7/10    (2017.01)
  G06K 9/46    (2006.01)
  G06K 9/52    (2006.01)
  G06K 9/62    (2006.01)
  G06T 11/00   (2006.01)

(52) U.S. Cl.
  CPC .............. *G06K 9/6218* (2013.01); *G06T 7/10* (2017.01); *G06T 7/11* (2017.01); *G06T 11/001* (2013.01); *H04N 1/60* (2013.01); *H04N 1/62* (2013.01); *G06T 2200/04* (2013.01); *G06T 2207/20092* (2013.01); *G06T 2207/20112* (2013.01)

(56) References Cited

U.S. PATENT DOCUMENTS

| | | | |
|---|---|---|---|
| 2004/0258305 A1 | 12/2004 | Burnham et al. | |
| 2006/0050335 A1* | 3/2006 | Dorrell | H04N 1/6086 358/516 |
| 2008/0212887 A1 | 9/2008 | Gori et al. | |
| 2010/0080448 A1* | 4/2010 | Tam | G06T 7/50 382/154 |
| 2014/0211993 A1* | 7/2014 | Ishii | H04N 5/23229 382/103 |

OTHER PUBLICATIONS

Thomas M Deserno: "Fundamentals of Biomedical Image Processing", Biomedical Image Processing, Oct. 21, 2010.

Oh-Yeol Kwon et al.: "Improved Posterized Color Images based on Color Quantization and Contrast Enhancement", International Journal of Electrical, Computer, Energetic, Electronic and Communication Engineering, vol. 5, No. 11, Jan. 1, 2011.

Aimi Salihah Abdul-Nasir et al.: "Modified Global and Modified Linear Contrast Stretching Algorithms: New Colour Contrast Enhancement Techniques for Microscopic Analysis of Malaria Slide Images", Computational and Mathematical Methods in Medicine, vol. 10, No. 2, Jan. 1, 2012.

Anthony Thyssen: "Color Modifications—IM v6 Examples", URL:http://www.imagemagick.org/Usage/colormods [retrieved on Aug. 23, 2016], Oct. 6, 2011, pp. 1-45.

H.D. Cheng et al.: "Color image segmentation: advances and prospects", Pattern Recognition, The Journal of the Pattern Recognition Society, Elsevier, GB, vol. 34, No. 12, Dec. 1, 2001.

Marisol Martinez Escobar: "An interactive color pre-processing method to improve tumor segmentation in digital medical images", URL:http://lib.dr.iastate.edu/cgi/viewcontent.cgi?article=2096&context=etd [retrieved on Aug. 23, 2016], Jan. 1, 2008, pp. 1-90.

Liu, Xin and Yetik, Imam Samil, Enhancing localization of prostate cancer, SPIE, 2013.

* cited by examiner

METHOD AND APPARATUS FOR ASSIGNING COLOURS TO AN IMAGE

FIELD OF THE INVENTION

The present invention relates to a method and apparatus for assigning preselected colours to an image or part thereof (such as one or more objects within an image). The term "image" is used herein in its usual sense, and includes visual representations such as pictures, maps and portions of text.

BACKGROUND OF THE INVENTION

A user may wish to alter an image for many reasons. For example, the image may not have sufficient clarity and certain details may not be clearly visible, such as owing to dullness or a poor choice of colours. Moreover, image contrast, which generally relates to an entire image, may be unsatisfactory for allowing clear visualization of the details in one or more regions of the image. Zooming in a specific region can currently be done, but this does not allow visualization of local quantitative differences between pixels.

Alternatively, an image may be perceived as unattractive or unappealing. This is often due to the user's dislike of the colours of one or more parts of the image, or of one or more object within the image. If the user does not like the colours, or when the colours do not clearly show details the user wishes to see, changing the colours of parts or all of the image can be difficult or time-consuming.

SUMMARY OF THE INVENTION

According to a first broad aspect of the invention, there is provided a method of assigning colours to an image or part thereof, comprising:
  selecting a sequence of colours (that is, with a specific order) for assignment to the image or part thereof (whether automatically or manually);
    determining a minimum intensity $I_{MIN}$ within the image or part thereof (such as the intensity value of the pixels or voxels in the image or part thereof);
    determining a maximum intensity $I_{MAX}$ within the image or part thereof (such as the intensity value of the pixels or voxels in the image or part thereof); and
    determining relative intensity values RIV(i) for each pixel or voxel i according to:

$$RIV(i) = f\left(\frac{I(i) - I_{MIN}}{I_{MAX} - I_{MIN}}\right)$$

where I(i) is an intensity of pixel or voxel i, and $f$ is a preselected function (such as to re-arrange the normalized values); and
    assigning colours to at least some pixels in the image or part thereof based on the relative intensity values and an order of each of the colours in the sequence.

The method may include segmenting one or more colours within the image or part thereof based on a non-threshold analysis of a colour profile curve derived from the image or part thereof.

The process of assigning colours to an image, or one or more parts of the image, is referred to as quantitative colouring (QC). While QC can be used to highlight features within an image, it can also be used to do the reverse—that is, to obscure or mask details in parts of any image, or in the image. Furthermore, it can be used to change the colours after these colours have being segmented (i.e. grouped).

The present invention is intended to be used in all areas when images are used, but in particular for medical images (which are by default in a greyscale), or any other area where clear visualization of detail by scientists or radiologists is critical.

In one embodiment, the method comprises selecting colours or shades in the original image and applying the method only to pixels or voxels of the colours or shades thus selected.

In one embodiment, $$f\left(\frac{I(i) - I_{MIN}}{I_{MAX} - I_{MIN}}\right) = \left(\frac{I(i) - I_{MIN}}{I_{MAX} - I_{MIN}}\right).$$

Thus, as a result of this method, a set of RIV values is created that constitute a coloured version of the original image or part thereof.

The method may include selecting automatically the image or a part thereof based on one or more criteria.

The method may include generating a new image by colouring the original image according to the sequence of colours.

According to a second broad aspect of the invention, there is provided a computer program product comprising instructions that, when executed on a computing device, controls the device to perform the method described above. The computer program product may be stored on a computer-readable medium, in some cases in permanent form, or transmitted.

According to a third broad aspect of the invention, there is provided an image produced by the method described above.

According to a fourth broad aspect of the invention, there is provided a system for assigning colours to an image or part thereof, comprising:
  a colour selector for selecting a sequence of colours for assignment to the image or part thereof (whether automatically or manually);
  an intensity determiner for determining a minimum intensity $I_{MIN}$ within the image or part thereof (such as the intensity value of the pixels or voxels in the image or part thereof), and for determining a maximum intensity $I_{MAX}$ within the image or part thereof (such as the intensity value of the pixels or voxels in the image or part thereof);
  a relative intensity value determiner for determining a relative intensity value RIV(i) for each pixel or voxel i according to:

$$RIV(i) = f\left(\frac{I(i) - I_{MIN}}{I_{MAX} - I_{MIN}}\right)$$

where I(i) is an intensity of pixel or voxel i, and $f$ is a preselected function (such as to re-arrange the normalized values; and
  a colour assignor for assigning colours to at least some pixels in the image or part thereof based on the relative intensity values and an order of each of the colours in the sequence.

In one embodiment, the system comprises a colour segmenter for segmenting one or more colours within the image or part thereof based on a non-threshold analysis of a colour profile curve derived from the image or part thereof.

The system may include selecting automatically the image a part thereof based on one or more criteria.

The system may include an image outputter for generating a new image by colouring the original image according to the assigned colours.

According to a fifth broad aspect of the invention, there is provided a method for segmenting cluster of colours with similar visual appearance, comprising:

selecting one or more colours within a cluster of pixels or colours to be segmented (whether automatically or manually);

determining colour vector directions originating from an initially selected colour of said one or more colours;

creating a colour profile curve in plural directions starting from an initially selected colour of said one or more colours based on a minimum perceptible colour difference (relating to a predefined notion of visual acuity); and analysing the colour profile curve to determine which colours in the cluster of colours have a substantially identical appearance as the initially selected colour (such as by identifying points in the colour profile curve corresponding to a—for example—minimum or maximum distance between suitably selected points and the curve).

According to this aspect of the invention, there is also provided a system for segmenting cluster of colours with similar visual appearance, comprising:

a colour selector for selecting one or more colours within a cluster of pixels or colours to be segmented (whether automatically or manually);

a vector generator for determining colour vector directions originating from an initially selected colour of said one or more colours;

a profiler for creating a colour profile curve in plural directions starting from an initially selected colour of said one or more colours based on a minimum perceptible colour difference (relating to a predefined notion of visual acuity); and an analyser for analysing the colour profile curve to determine which colours in the cluster of colours have a substantially identical appearance as the initially selected colour (such as by identifying points in the colour profile curve corresponding to a—for example—minimum or maximum distance between suitably selected points and the curve).

The system may include an output for outputting the colour or colours having the substantially identical appearance as the initially selected colour.

It should be noted that any of the various individual features of each of the above aspects of the invention, and any of the various individual features of the embodiments described herein including in the claims, can be combined as suitable and desired.

BRIEF DESCRIPTION OF THE DRAWING

In order that the invention may be more clearly ascertained, embodiments will now be described, by way of example, with reference to the accompanying drawing, in which.

DETAILED DESCRIPTION OF EMBODIMENTS

Figure 1:
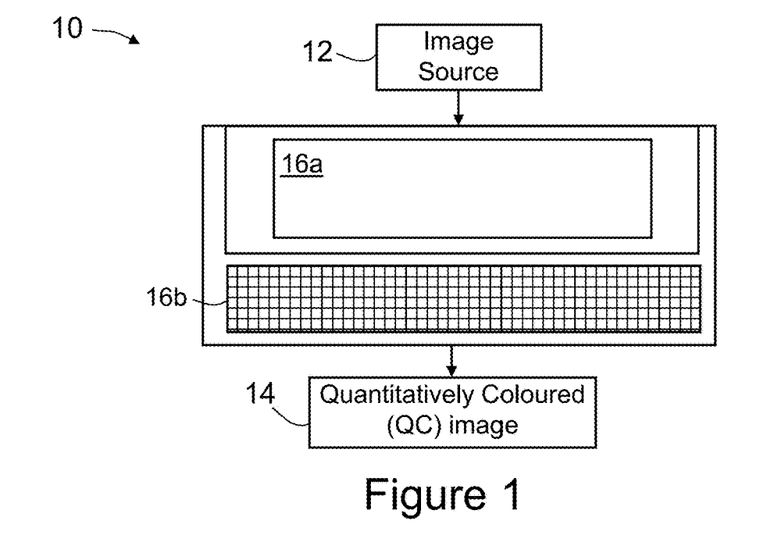
FIG. 1 is a schematic view of a quantitative colouring system according to an embodiment of the present invention.

According to an embodiment of the present invention, there is provided a quantitative colouring system, shown schematically at 10 in FIG. 1 together with an image source 12 of an original image and an output of system 10 in the form of a quantitatively coloured (QC) image 14. Broadly speaking, system 10 receives an original image from image source 12, determines and assigns an ordered set of selected colours to the original image, or to one or more parts thereof, and outputs output image 14 accordingly, with a different colour scheme from that of the original image.

Image source 12 may comprise, for example, an image acquisition device, an image creation device or an image storage device, such as a camera, a scanner, a mobile telephone, or a computer. The original image may comprise a picture, a map, or text, and may be provided to system 10 in any digital format. System 10 may also include image source 12, and thereby also produce the original image for quantitative colouring.

System 10 comprises a computing system, which typically is in the form of a computer but may be in the form of—for example—a mobile telephone or tablet computer provided with suitable hardware and software. System 10 includes a user interface comprising a display 16a and a keyboard 16b, an output (not shown) in the form of a bus, and a controller (not shown). QC image 14 may be output in any suitable manner, such as by displaying to display 16a, printing or transmission (via the bus), or storage to a memory (whether of system 10 or otherwise).

Figure 2:
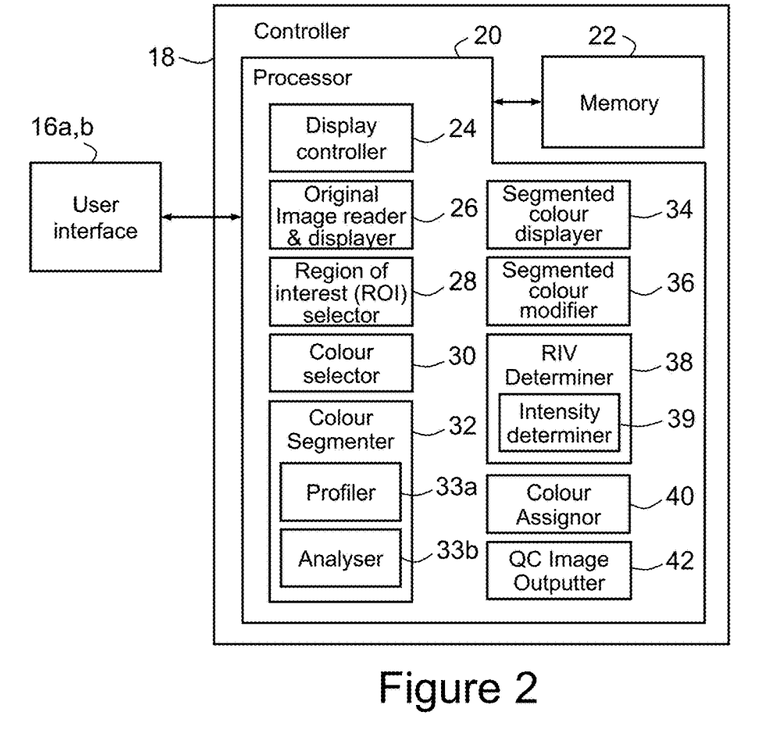
FIG. 2 is a schematic view of the user interface and controller of the quantitative colouring system of FIG. 1.

FIG. 2 is schematic view of user interface 16a, b and the controller 18 of system 10. Controller 18 includes a processor 20 and a memory 22. Processor 20 includes a display controller 24 for controlling display 16a, an image reader and displayer 26, a region of interest (ROI) selector 28, a colour selector 30, an automatic colour segmenter 32 (which includes a profiler 33a and an analyser 33b), a segmented colour displayer 34, a segmented colour modifier 36, a relative intensity value (RW) determiner 38 (which includes an intensity determiner 39), a colour assignor 40 and a QC image outputter 42. The functions of each of these components are described below.

Figure 3:
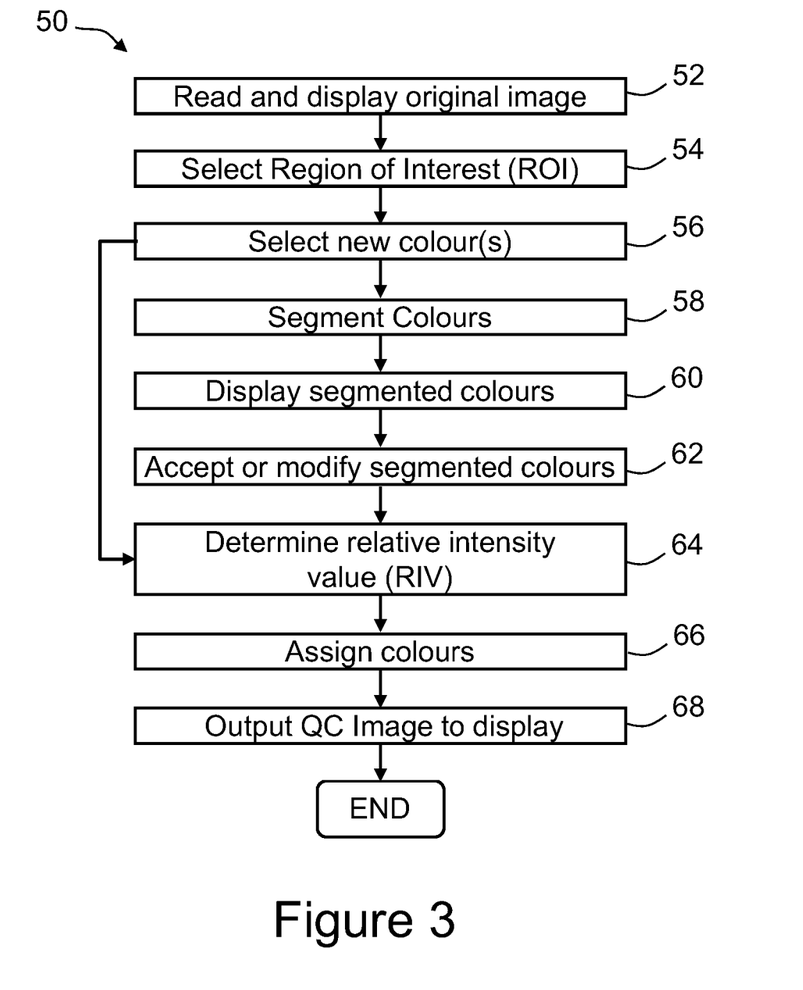
FIG. 3 is a flow diagram of the operation of the quantitative colouring system of FIG. 1.
Figure 4:
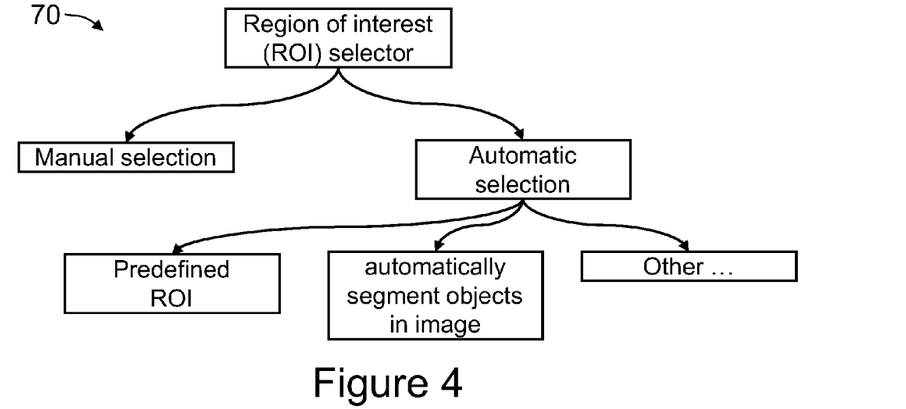
FIG. 4 illustrates the operation of the region of interest (ROI) selector of the quantitative colouring system of FIG. 1.

FIG. 3 is a flow diagram 50 of the operation of system 10 of FIG. 1. Each step corresponds to the operation of, respectively, image reader and displayer 26, region of interest (ROI) selector 28, colour selector 30, automatic colour segmenter 32, segmented colour displayer 34, segmented colour modifier 36, relative intensity value (RIV) determiner 38, colour assignor 40 and QC image outputter 42. Thus, at step 52, the original image is read/inputted and displayed to display 16a. At step 54, the user uses user interface 16b to select one or more regions of interest (ROIs) for quantitative colouring. The default setting is to quantitatively colour the whole image and, in automatic operation system 10—rather than the user—selects the parts of the image to be quantitatively coloured based on predefined criteria. The operation of region of interest (ROI) selector 28 is further illustrated at 70 in FIG. 4.

Optionally, step 54 may be done by image segmentation using a segmentation algorithm to segment a specific object, or any other means for automatically identifying (or segmenting) parts of an image.

At step 56, colour selector 30 selects (whether under user or automated control) the colour(s) to be assigned to the image. This selection may be made from some or all of the colours in the original image or in the selected ROI(s). If under manual control, colour selector 30 controls system 10 to display a panel from which the user can select the colour(s) that he or she wishes the ultimate QC image 14 to have. If under automated control, colour selector 30 generates the required selection based on one or more predefined criteria; for example, colour selector 30 may select a user-specified or predefined number of equally spaced colours from the existing colour palette of the original image.

The order in which the colours are selected also indicates the order in which they should be subsequently assigned, from first to last. Hence, the ordered set of selected colours constitutes a sequence of colours. Colour selector 30 is also user controllable to subsequently modify the selection of colours or their order in the sequence, by displaying the sequence of colours on display 16a for user manipulation.

When this colour or these colours have been selected, colour segmenter 32 then, at step 58, automatically segments (or categorizes) colours within the original image. This process of colour segmentation is illustrated schematically in FIGS. 5 to 10 and, in broad terms, involves segmenting the ROI(s) into plural individual segments based on colour. This is performed because the original image may not contain a simple palette of colours the readily defines clear delineated regions. There may be a smooth colour gradient from one (e.g. red) pixel to another (e.g. blue) pixel; segmentation determines where a suitable boundary between these pixels should lie, such that two (in this example) regions or image segments may be defined. It should be noted that segmentation may not always be required or desired, in which processing will pass from step 56 to step 64 (see below). In addition, segmentation may be performed at other points in the processing such as before step 56, in which case steps 58 to 62 (discussed below) would precede step 56.

Figure 5:
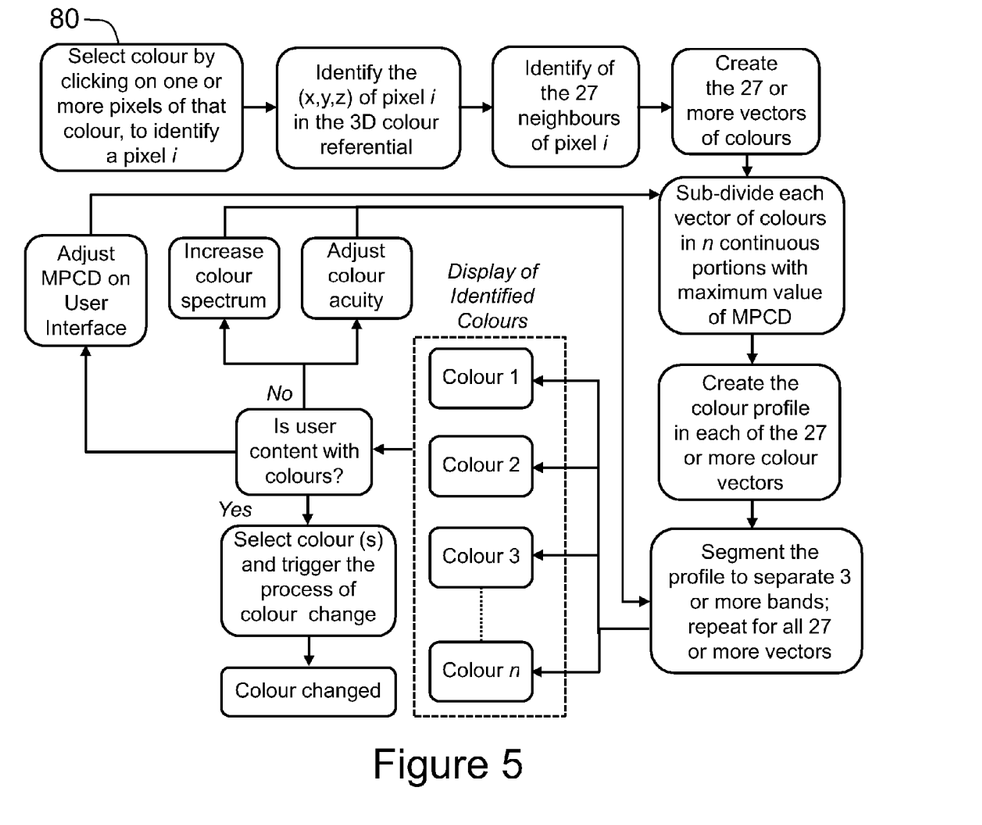
FIG. 5 is a flow diagram illustrating automated segmentation and display of a cluster of colours with substantially the same visual appearance as initially selected colours within an image, as performed by the colour segmenter of the quantitative colouring system of FIG. 1.

Thus, referring to FIG. 5, the process of colour segmentation of step 58 starts (at 80) by the user selecting a pixel (such as by clicking on it) or an area containing pixels (such as by clicking and dragging) of the colour(s) the user wishes to segment. Each pixel of the colour selected is identified by system 10 in a 3D colour referential map. This 3D referential map is, in this embodiment, RGB (Red, Green, Blue), but may take any other suitable form, such as HLS (Hue, Lightness, saturation), HVS (Hue, Value, Saturation) or any other 3D colour scheme.

Then, from the selected colour pixel, colour segmenter 32 creates a series of vectors (J), all starting from the initial pixel i. Vectors (J) represent all the directions in 3D space that could start from pixel i (though, for simplicity, only 27 directions are considered in this description). Colour segmenter 32 then creates vectors representing all the possible colours that could originate from pixel i. However, as colour is a discreet event, a colour missing in a few pixels may not mean that this colour has not being selected by the user; thus, a notion of colour acuity (CA) is needed to capture the level of discreetness the user may wish in the colour selection. The CA allows a more subtle segmentation of colours in a given direction. However, the CA does not exceed the minimum perceptible colour difference (MPCD): this is the colour difference between pixel i and the furthest away pixel (in colour) beyond which the user can clearly perceive that it has a different colour from that of pixel i. Both the CA and MPCD are adjustable and controllable by the user.

In each vector, only a distance from pixel i to the MPCD are analysed by colour segmenter 32. Profiler 33a of colour segmenter 32 creates a colour profile curve, and retrieves three or more colours and presents them to the user. If the user confirms the selection of this automatically selected cluster of colours, the selected colours can then be changed in the image according to the quantitative colouring (QC) method of this embodiment. If the user is not content with any of the automatically selected colours, he or she may adjust the MPCD and CA, or increasing the colour spectrum, in order to refine the detected colours. The user thus eventually finds the colours he or she wishes to change.

Figure 6:
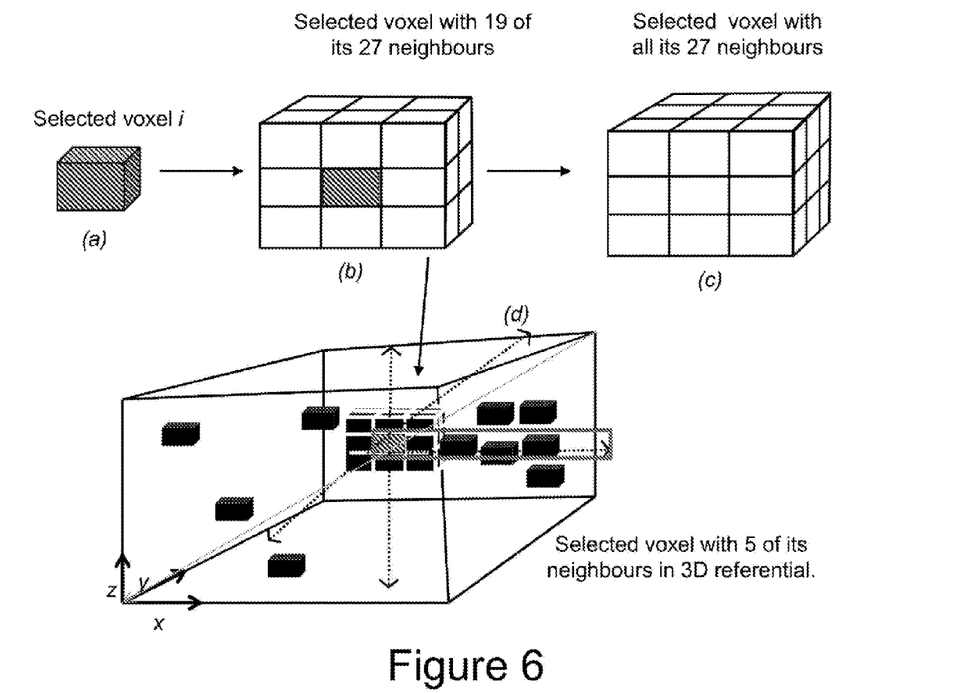
FIG. 6 illustrates a colour as selected by the colour segmenter of the quantitative colouring system of FIG. 1 represented as a voxel in space.

FIG. 6 includes schematic views of: (a) an example of colour pixel, represented in space as a voxel, representative of the colour to be segmented, (b) the same voxel with 19 of its 27 neighbours in 3D space, (c) the same pixel or voxel with all of its 27 neighbours, and (d) the position of that pixel or voxel in a 3D colour referential.

Figure 7:
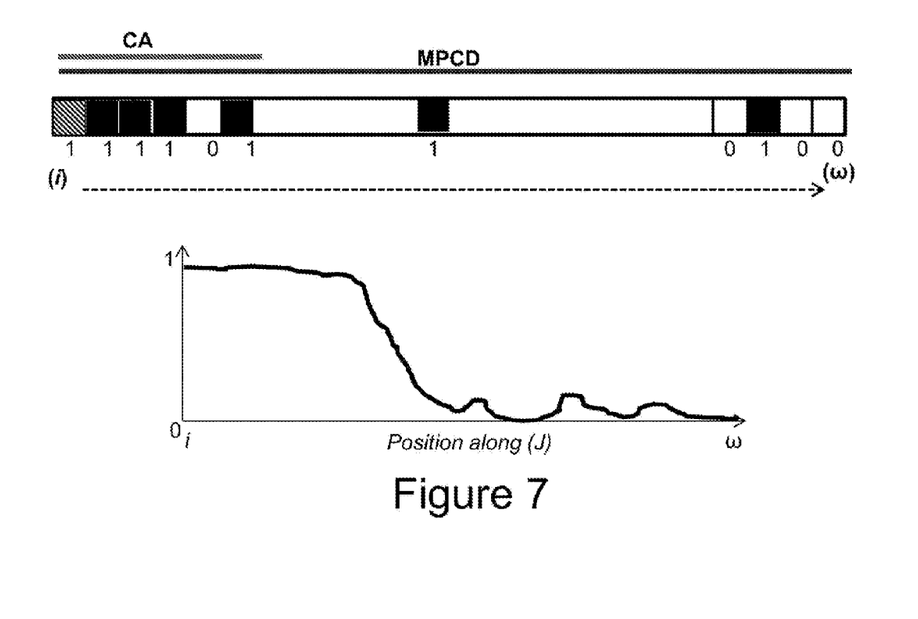
FIG. 7 illustrates the creation of the vector of colours and the colour profile curve by the quantitative colouring system of FIG. 1.

The maximum length of vector (J) is determined by the unit in the colour system. In a 255*255*255 colour system, such as RGB, the maximum diagonal is 441, so the maximum length of (J) is 441. Colour segmenter 32 subdivides vector (J) into MPCD units, and each MPCD unit is then subdivided into CA units. The default value of MPCD is 20 and of CA is 5. However, these values are adjustable via user interface 16a, b. The profile is only analysed in a length equal MPCD. If a pixel exists within the image, its value is set to 1 in the vector, and if the pixel colour does not exist in the image, it is set to 0. Values are then averaged over a length of CA and the obtained value is later used as y value on the colour profile curve. The portion of vector between pixel i and a distance corresponding to the MPCD is subdivided into n consecutive points, with n being the number of CA portions within the MPCD. These n points form the x-axis of the colour profile curve which is created, as shown in FIG. 7 which illustrates the creation of the vector of colours and the colour profile curve.

Figure 8:
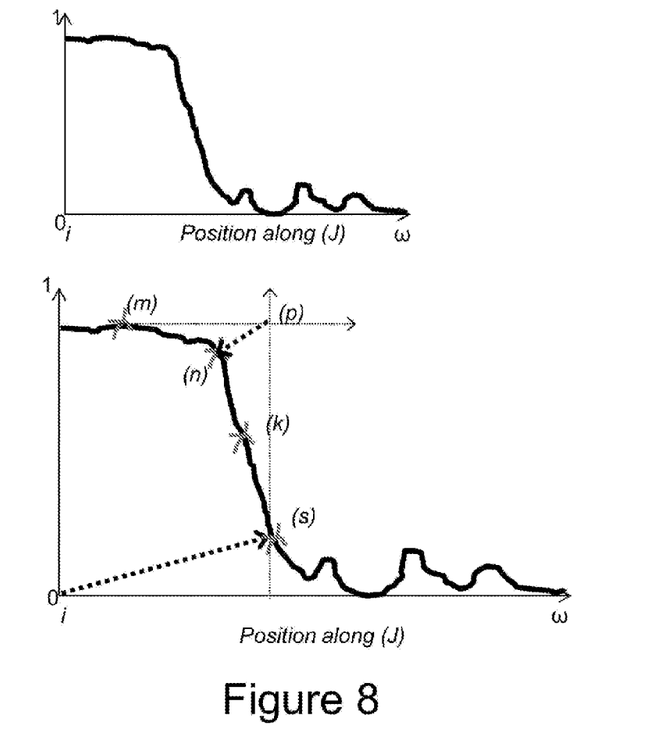
FIG. 8 illustrates the analysis of the colour profile within the vector of colours of FIG. 7.
Figure 9:
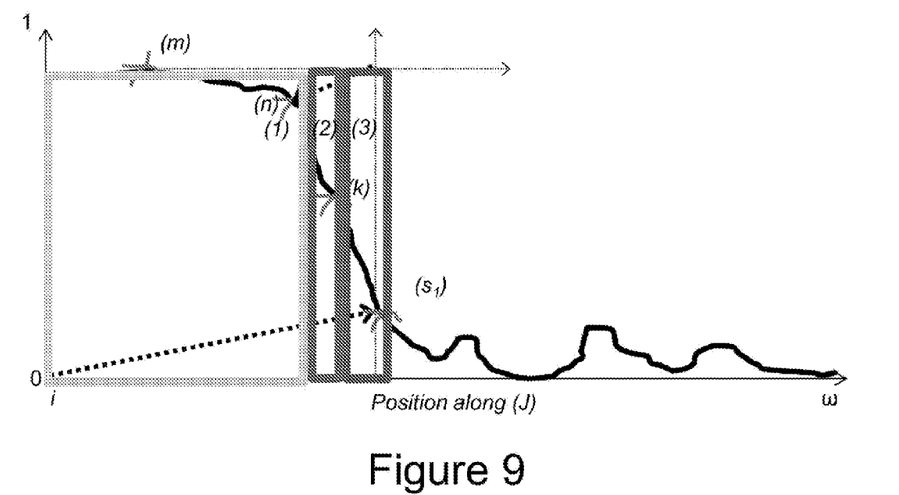
FIG. 9 illustrates the selection of the cluster of colours of similar visual appearance as the selected colour by the quantitative colouring system of FIG. 1.
Figure 10:
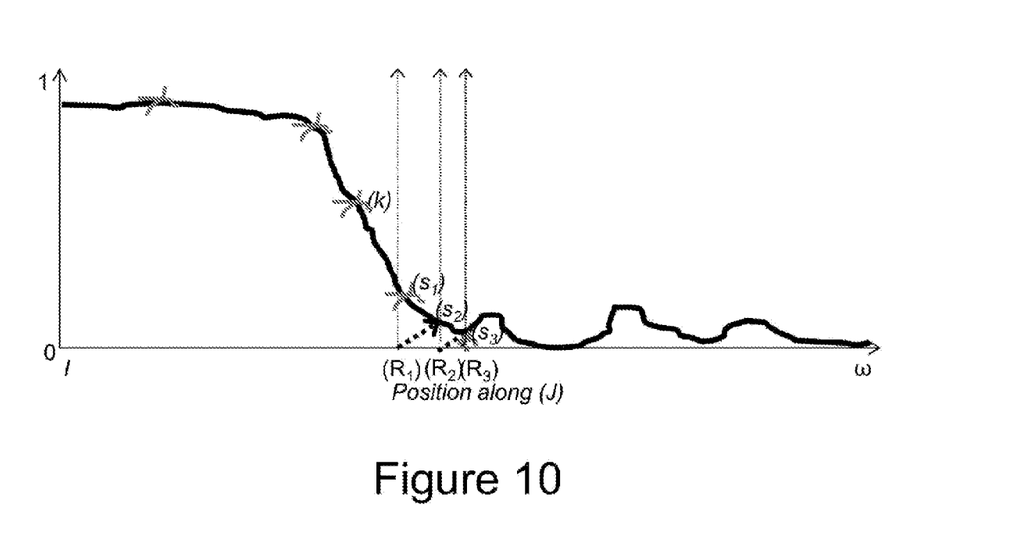
FIG. 10 illustrates additional analysis of the colour profile to increase the size of cluster of colour of similar visual appearance as the selected colour, and therefore the colour spectrum by the quantitative colouring system of FIG. 1.

The colour profile curve starts at pixel i, selected by the user. Referring to FIGS. 8 to 10, the curve is analyzed by an analyser 33b of colour segmenter 32 by, initially, detecting a point (s1) corresponding to the smallest distance between pixel i of coordinates (0,0) and the colour profile curve. Point ($s_1$) corresponds to the point where the selected colour along the vector has faded markedly. Then (m) is identified as the point with the maximum y value in the portion of the curve between pixel i and ($s_1$). From (m), this allows identification of (p) which has the same y value as (m) and an x value of ($s_1$). From (p), point (n) is identified as the smallest distance between (p) and the colour profile curve. Point (n) corresponds to the point where the selected colour starts fading markedly. Finally, point (k) is identified as the inflexion point in the portion of the curve between (n) and ($s_1$). Point (k) is the point where the selected colour is fading at the highest rate [see WO 2011/029153].

These points identify a cluster or range of colours that visually correspond to the selected colour. Those of colour 1 correspond visually to the cluster of colours located between i and (n). Those of colour 2 correspond to the cluster between pixel i and (k). Those of colour 3 correspond to the cluster between pixel i and (s) (see FIG. 10).

It should be noted that this delineation of three colours cluster is indicative only. In principle any number of colours may be defined, such as a fourth colour between (n) and (k). Furthermore, as shown in FIG. 10, it may occur in some circumstances that the user sees that the identified colours do not fully capture the range of colours he or she wishes to select and change. This will occur if colour the user wished to select in fact encompasses a cluster of colours extending beyond point ($s_1$). The user will then press on 'increase colour spectrum'. This will trigger a re-analysis of the colour profile curve but this time starting from point ($R_1$) which has the same x value as ($s_1$) but a y value of 0 and identify ($s_2$) a new colour 3 with a corresponding to cluster of colours between i and by ($s_2$) will be displayed and/or the image change accordingly. If the user is not satisfied, he or she can again trigger an 'increase colour spectrum', and a similar analysis of the curve is conducted but this time starting from $s_2$. It should be noted that the triggering 'increase colour spectrum' cannot be requested indefinitely. The minimum distance from a point to a curve will retrieve the same point when the curve becomes horizontal relative to the x-axis, and/or the curve has been analysed along the full MPCD distance. When this arises then the processor alerts the user that all colours within the profile that could be associated with the selected colours have been identified.

In each case, the resulting segmented colours are—at step 60—displayed to display 16a by segmented colour displayer 34, thus informing the user how the colours in the original image will be segmented: the colour or colours having a substantially identical appearance as the initially selected colour are displayed for user approval.

At step 62, the user may input his or her approval of the segmentation or, if desired, modify the segmentation using segmented colour modifier 36.

Figure 11:
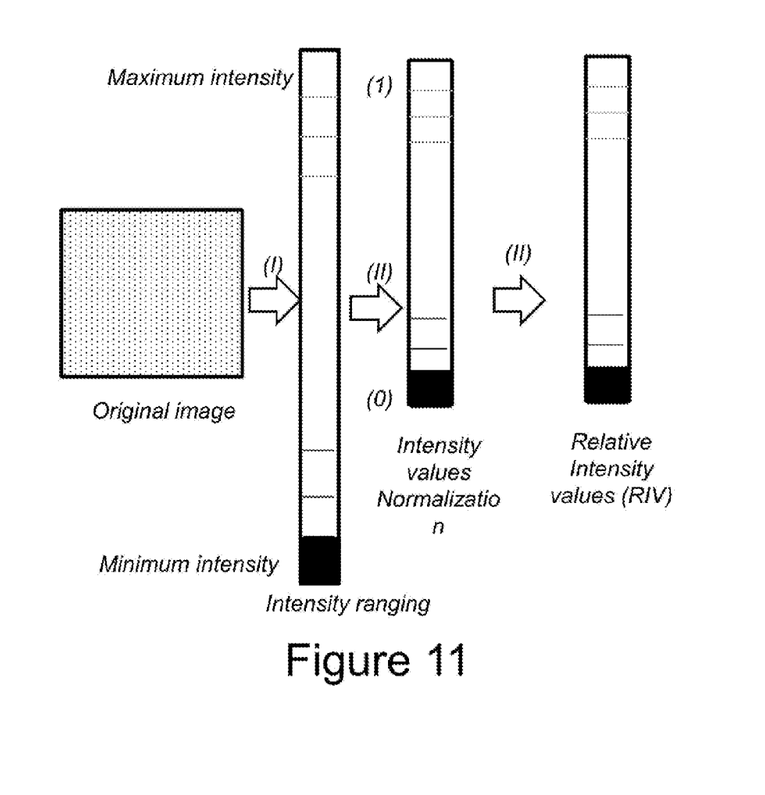
FIG. 11 illustrates the operation of the relative intensity value (RIV) determiner of the quantitative colouring system of FIG. 1.

At step 64, intensity determiner 39 of RW determiner 38 determines a minimum intensity $I_{MIN}$ and a maximum intensity $I_{MAX}$ within the image (or part thereof) to which the colours are to be assigned, and RW determiner 38 orders all the intensity values within the image from minimum intensity to maximum intensity, and normalizes these intensity values according to:

$$N(i) = \left(\frac{I(i) - I_{MIN}}{I_{MAX} - I_{MIN}}\right)$$

where N(i) is the normalized intensity, I(i) is the intensity of pixel i, and $I_{MAX}$ and $I_{MIN}$ are respectively the maximum and minimum intensity values within the image (or part thereof) to which the colours are to be assigned (see FIG. 11). From the normalized intensity values, relative intensity values (REV (i)) are then calculated, where RIV(i)=ƒ(N(i)). The function ƒ is of any desired and suitable form, such as a linear function, a polynomial function, an exponential function, a logarithmic function, or a Gaussian function. The function ƒ is selected such that its behaviour in the range N(i)=0 to 1 is predictable. Function ƒ modifies the normalized intensity values N(i) in a predictable manner; it may for example magnify or shrink differences in normalized intensity values to highlight or reduce colour differences between adjacent pixels, in order to make details more or less visible locally.

Figure 12:
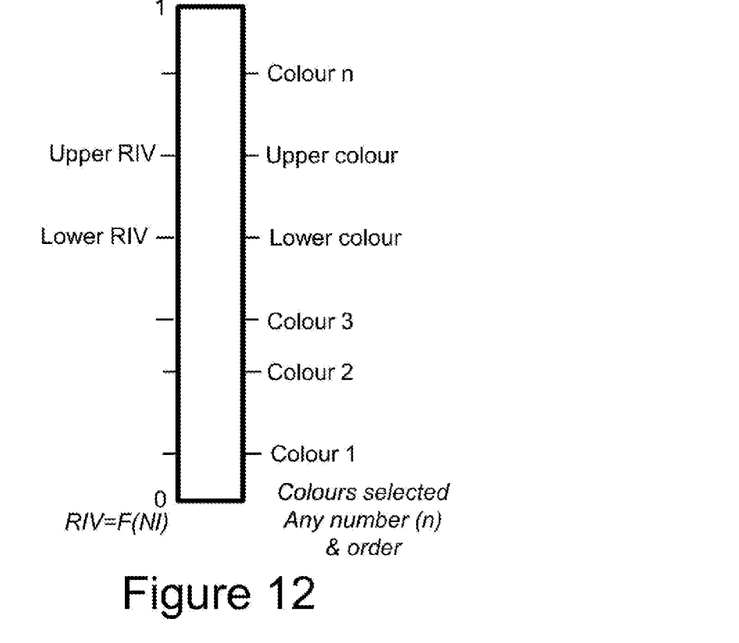
FIG. 12 illustrates the operation of the colour assignor of the quantitative colouring system of FIG. 1.

Relative intensity values and ordered colours are then associated as shown FIG. 12, which illustrates the operation of colour assignor 40. A new function g is selected, which can also any desired and suitable form, such as a linear function, a polynomial function, an exponential function, a logarithmic function, or a Gaussian function. The actual colour to be assigned to each pixel is then determined by colour assignor 40 according to:

$$C(i) = g\left(\frac{RIV(i) - RIV_n}{RIV_{n+1} - RIV_n}\right)(C_{n+1} - C_n),$$

where C(i) is the colour of pixel i, RIV(i) is the calculated value of RIV for pixel i, $RIV_n$ is the RIV of colour n and $RIV_{n+1}$ is the RIV of color n+1. $C_n$ and $C_{n+1}$ are the colours n and n+1 respectively. Function g, as in this example, may be set to $$g\left(\frac{RIV(i) - RIV_n}{RIV_{n+1} - RIV_n}\right) = \left(\frac{RIV(i) - RIV_n}{RIV_{n+1} - RIV_n}\right),$$

if the user does not desire to further manipulate the assignment of colours.

Figure 13:
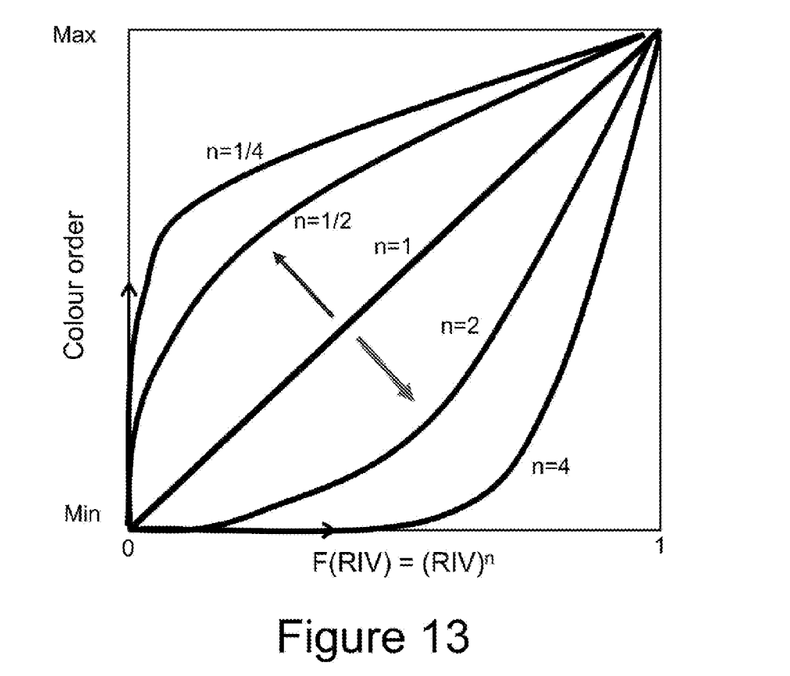
FIG. 13 illustrates an example of the effect of the variation of the RIV on the relative importance of the selected colours of the image on the displayed image by the quantitative colouring system of FIG. 1.

As stated above, allowing the user to select or modify function ƒ provides a mean for changing the relative importance of selected colours to highlight or dampen details. In this embodiment an example of how this works is shown in FIG. 13, which illustrates the modulation function ƒ used to enhance or de-enhance some features in the image.

The function ƒ selected is an exponential function, such as ƒ=RIV(i)$^m$. Changing the value of the exponent adjusts the relative dominance of the colour first selected (i.e., low n) versus the colours selected last (high n), thereby highlight or toning specific details.

In this example:
When the exponent is m=1, all colours have the same importance.
As the exponent m increases above 1, the more colours first selected dominate the image. That is, features with colours selected first are more highlighted in the image.
The opposite effect occurs when the exponent m decreases and becomes less than 1. The closer m is to 0, the more dominant become features with high values of n (especially the last colour selected).

Thus, the present invention provides a method and system for automatically (or manually if desired) highlighting specific details in any image using gradient of colours which reflects, and magnifies, the relative differences in intensity values between pixels or voxels in a selected parts of the image. This thereby allows the creation of a clearer visualization of details in specific areas of the image, or in objects within the image, or in entire image.

Modifications within the scope of the invention may be readily effected by those skilled in the art. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge in any country.

The invention claimed is:

1. A system for segmenting cluster of colours within an image, the system comprising:
   a colour selector for identifying or selecting at least one colour within the image;
   a profiler for creating a colour profile curve from a reference point ($x_i$, 0) corresponding to the at least one colour to all colours in a selected colour scheme; and
   an analyser for analysing the colour profile curve by detecting a closest point ($s_1$) on the colour profile curve to the reference point ($x_i$, 0), locating a point of inflexion on the colour profile curve between the reference point ($x_i$, 0) and the closest point ($s_1$), and segmenting a portion of the colour profile curve between the reference point ($x_i$, 0) and the point of inflexion, the segmented portion of the colour profile curve constituting a cluster of colours corresponding to the at least one colour;
   wherein the colour selector is further configured for selecting a sequence of colours for assignment to the cluster of colours; and the system further comprises:
   an intensity determiner for determining a minimum intensity $I_{MIN}$ within the cluster of colours, and for determining a maximum intensity $I_{MAX}$ within the cluster of colours; and
   a relative intensity value determiner for determining a relative intensity value RIV(i) for each pixel or voxel i within the cluster of colours according to:

$$RIV(i) = f\left(\frac{I(i) - I_{MIN}}{I_{MAX} - I_{MIN}}\right)$$

where I(i) is an intensity of pixel or voxel i, and $f$ is a preselected function; and
   a colour assignor for assigning colours to at least some of the pixels or voxels based on the relative intensity values and an order of each of the colours in the sequence.

2. A system as claimed in claim 1, comprising an output for outputting the colour or colours having the substantially identical appearance as the initially selected colour.

3. A system as claimed in claim 1, wherein the analyser subdivides a length of the colour profile curve between the reference point ($x_i$, 0) and a point corresponding to the minimum perceptible colour difference into a set of colours.

4. A system as claimed in claim 3, wherein the length of the colour profile curve between the reference point ($x_i$, 0) and a point corresponding to the minimum perceptible colour difference is equal to the minimum perceptible colour difference.

5. A system as claimed in claim 1, further comprising automatically segmenting another cluster of colours by automatically analysing another portion of the colour profile curve.

6. A system as claimed in claim 3, including automatically determining when all colours within the desired cluster of colours have been identified.

7. A system as claimed in claim 1, comprising an image outputter for generating a new image by colouring the original image according to the sequence of colours.

8. A system as claimed in claim 1, wherein $$f\left(\frac{I(i) - I_{MIN}}{I_{MAX} - I_{MIN}}\right) = \left(\frac{I(i) - I_{MIN}}{I_{MAX} - I_{MIN}}\right).$$

9. A system as claimed in claim 1, configured to select automatically the image or a part thereof based on one or more criteria.

10. A system as claimed in claim 1, comprising an output for outputting the colour or colours having the substantially identical appearance as the initially selected colour.

11. A computer-implemented method for segmenting a cluster of colours within an image, the method comprising:
   identifying or selecting at least one colour within the image;
   creating a colour profile curve from a reference point ($x_i$, 0) corresponding to the at least one colour to all colours in a selected colour scheme;
   analysing the colour profile curve by detecting a closest point ($s_1$) on the colour profile curve to the reference point ($x_i$, 0);
   locating a point of inflexion on the colour profile curve between the reference point ($x_i$, 0) and the closest point ($s_1$);
   segmenting a portion of the colour profile curve between the reference point ($x_i$, 0) and the point of inflexion, the segmented portion of the colour profile curve constituting a cluster of colours corresponding to the at least one colour;
   selecting a sequence of colours for assignment to the cluster of colours;
   determining a minimum intensity $I_{MIN}$ within the cluster of colours;
   determining a maximum intensity $I_{MAX}$ within the cluster of colours; and
   determining relative intensity values RIV(i) for each pixel or voxel i within the cluster of colours according to:

$$RIV(i) = f\left(\frac{I(i) - I_{MIN}}{I_{MAX} - I_{MIN}}\right)$$

where I(i) is an intensity of pixel or voxel i, and $f$ is a preselected function; and assigning colours to at least some of the pixels or voxels based on the relative intensity values and an order of each of the colours in the sequence.

12. A method as claimed in claim 11, comprising: (i) selecting colours or shades in the image and applying the method only to pixels or voxels of the colours or shades thus selected, and/or (ii) selecting automatically the image based on one or more criteria.

13. A method as claimed in claim 11, wherein $$f\left(\frac{I(i) - I_{MIN}}{I_{MAX} - I_{MIN}}\right) = \left(\frac{I(i) - I_{MIN}}{I_{MAX} - I_{MIN}}\right).$$

14. A method as claimed in claim 11, comprising generating a new image by colouring the image according to the sequence of colours.

15. A non-transitory computer-readable medium comprising instructions that, when executed on a computing device, control the device to perform the method of claim 11.

16. A system as claimed in claim 1, wherein the colour scheme is a RBG (Red, Blue, Green) colour scheme, an HLS (Hue, Lightness, saturation) colour scheme, or an HVS (Hue, Value, Saturation) colour scheme.

17. A system as claimed in claim 1, wherein a length of the colour profile curve is a minimum perceptible colour difference.

18. A system as claimed in claim 17, including adjusting the minimum perceptible colour difference.

19. A method as claimed in claim 11, wherein the colour scheme is a RBG (Red, Blue, Green) colour scheme, an HLS (Hue, Lightness, saturation) colour scheme, or an HVS (Hue, Value, Saturation) colour scheme.

20. A method as claimed in claim 11, wherein a length of the colour profile curve is a minimum perceptible colour difference.

21. A method as claimed in claim 20, including adjusting the minimum perceptible colour difference.

22. A method as claimed in claim 11, including subdividing a length of the colour profile curve between the reference point ($x_i$, 0) and a point corresponding to the minimum perceptible colour difference into a set of colours.

23. A method as claimed in claim 22, wherein the length of the colour profile curve between the reference point ($x_i$, 0) and a point corresponding to the minimum perceptible colour difference is equal to the minimum perceptible colour difference for a colour.

24. A method as claimed in claim 11, further comprising automatically segmenting another cluster of colours by automatically analysing another portion of the colour profile curve.

25. A method as claimed in claim 22, including automatically determining when all colours within the desired cluster of colours have been identified.

* * * * *